United States Patent
Shin et al.

(10) Patent No.: US 9,696,165 B2
(45) Date of Patent: Jul. 4, 2017

(54) LAST-MILE NAVIGATION USING SMARTPHONES

(71) Applicant: THE REGENTS OF THE UNIVERSITY OF MICHIGAN, Ann Arbor, MI (US)

(72) Inventors: Kang G. Shin, Ann Arbor, MI (US); Yuanchao Shu, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 15/012,957

(22) Filed: Feb. 2, 2016

(65) Prior Publication Data
US 2016/0223340 A1 Aug. 4, 2016

Related U.S. Application Data

(60) Provisional application No. 62/111,420, filed on Feb. 3, 2015.

(51) Int. Cl.
*G01C 21/20* (2006.01)
*G01C 21/08* (2006.01)

(52) U.S. Cl.
CPC ......... *G01C 21/206* (2013.01); *G01C 21/08* (2013.01)

(58) Field of Classification Search
CPC .............................. G01C 21/08; G01C 21/206
USPC .................................................. 701/400, 525
See application file for complete search history.

(56) References Cited

U.S. PATENT DOCUMENTS

| | | | |
|---|---|---|---|
| 2003/0179133 A1 | 9/2003 | Pepin et al. | |
| 2007/0018890 A1 | 1/2007 | Kulyukin | |
| 2010/0305845 A1 | 12/2010 | Alexandre et al. | |
| 2011/0264400 A1 | 10/2011 | Youssef et al. | |
| 2012/0143495 A1 | 6/2012 | Dantu | |
| 2013/0177208 A1 | 7/2013 | Haverinen | |

FOREIGN PATENT DOCUMENTS

| WO | WO-2014074837 A1 | 5/2014 |
|---|---|---|
| WO | WO-2014159713 A1 | 10/2014 |

OTHER PUBLICATIONS

Anshul Rai, et al "Zee: Zero-Effort Crowdsourcing for Indoor Localization", MobiCom '12, Aug. 22-26, 2012.
(Continued)

*Primary Examiner* — Tyler J Lee
(74) *Attorney, Agent, or Firm* — Harness, Dickey & Pierce, P.L.C.

(57) ABSTRACT

Although GPS has become a standard component of smartphones, providing accurate navigation during the last portion of a trip remains an important but unsolved problem. Despite extensive research on localization, the limited resolution of a map imposes restrictions on the navigation engine in both indoor and outdoor environments. To bridge the gap between the end position obtained from legacy navigation services and the real destination, a "last-mile" navigation system is proposed to enable plug-and-play navigation in indoor and semi-outdoor environments. The system exploits the ubiquitous, stable geomagnetic field and natural walking patterns to navigate the users to the same destination taken by an earlier traveler. Unlike existing localization and navigation systems, the proposed system is infrastructure-free, energy-efficient and cost-saving.

17 Claims, 11 Drawing Sheets

(56) References Cited

OTHER PUBLICATIONS

P. Mazumder et al "Generating Indoor Maps by Crowdsourcing positioning data from smartphones", IEEE Oct. 17-30, 2014.
Piotr Mirowski et al "SignalSLAM: Simultaneous Localization and Mapping With Mixed WiFi Bluetooth, LTE and Magnetic Signals", International Conference on Indoor Positioning and Indoor Navigation, Montbeliard (2013).
Yuanqing Zheng, et al "Travi-Navi: self-deployable indoor navigation system" MobiCom '14, Sep. 7-11, 2014.

LAST-MILE NAVIGATION USING SMARTPHONES

CROSS-REFERENCE TO RELATED APPLICATIONS

This application claims the benefit of U.S. Provisional Application No. 62/111,420 filed on Feb. 3, 2015. The entire disclosure of the above application is incorporated herein by reference.

FIELD

The present disclosure relates to a last-mile navigation using smartphones.

BACKGROUND

Location-relevant services and applications have been widely-studied topics in the mobile computing community over the past few years. Most of the researchers focus on localization of devices/users. Currently, with the help of space satellites, meter-level positioning accuracy can be achieved in outdoor environments (e.g., using GPS, GLONASS, etc.), and at the same time, numerous approaches have also been proposed to localize users in indoor environments. Accurate localization techniques and map information make real-time navigation a reality. Most research efforts in navigation have been invested in path planning and optimization with given starting and destination locations. However, due to the lack of accurate map information, satisfactory navigation cannot always be achieved, especially in the last portion of a trip. For example, Google Map can navigate users to a building (more specifically, to the entrance of the building) from a place tens of miles away, but fails to find a feasible path to the final destination, the meeting room inside the building. We call this imperfection the last-mile navigation problem. The last mile was originally used in the field of communications to refer to the final leg of communications connectivity to retail customers. The last mile is typically the speed bottleneck in communication networks. Here the term 'last mile' refers to the imperfection in a navigation system.

The main reason for this problem is the map's insufficient path information, making the exact destination unknown and unreachable. Technically, most navigation services are only able to navigate a user to a place that is connected by at least one indexed path, such as a trunk road. If the end position is isolated in the map database (even if it is accessible in real life), navigation systems cannot connect coordinates of two positions. This type of navigation is sufficient during most part of a trip, but may fail to function properly in its "last mile." For instance, Google Map cannot provide fine-grained navigation service in a public park or a large parking lot, let alone offer guidance to numerous points of interest inside a building.

The navigation problem is more complicated in indoor environments. Despite the existence of extensive research on indoor localization, few large-scale systems have been deployed due to the required labor-intensive and time consuming bootstrap effort (i.e., indoor map construction). Even with their deployment, indoor localization systems still face an onerous calibration process (e.g., for radio-based fingerprint systems) and need to deploy path planning algorithms to enable navigation.

To meet the ever-growing demand for navigation service and bridge the gap between the user's final destination and the end position provided by current navigation services (e.g., Google Map), this disclosure proposes a new lightweight, plug-and-play last-mile navigation system, referred to herein as FollowUp. The main idea of last-mile navigation system is to use "scent" or "crumbs" left behind by previous travelers (a.k.a., leaders). Specifically, during a trace-collection phase, the navigation system records a bunch of sensory data with a smartphone during the leader's walking trip. It then recognizes the leader's walking pattern (e.g., steps, turns, upstairs) and packs them together with information extracted from the geomagnetic field to build a reference trace. During a navigation phase, the navigation system installed in a follower's smartphone will compare current sensor readings with the reference trace, and navigates him, in real time, from the same starting point to the final destination. This way, irrespective of incomplete map information, the last-mile navigation system is able to navigate the followers to any Point of Interest (PoI) as long as it was visited before by a leader. For example, the meeting coordinator can provide attendees with data trace from the entrance of a building to the meeting venue to save time. Vendors and restaurant owners can collect data traces on their own from several entrances of a shopping center to their shops, and then share them with others for promotional purposes. In fact, the leader and the follower can be the same person. For example, one can record a trace from a parking spot to the airport terminal, and use it for reverse navigation back to his car after a multi-day trip.

Unlike other leader-follower navigation systems, the proposed system neither relies on an infrastructure (e.g., maps, WiFi APs, etc.) nor requires any additional hardware (e.g., beacons or landmarks). In addition, the proposed navigation system is an all-weather navigation system as it exploits people's natural walking pattern and the ubiquitous geomagnetic field, minimizing the constraints imposed on users.

This section provides background information related to the present disclosure which is not necessarily prior art.

SUMMARY

This section provides a general summary of the disclosure, and is not a comprehensive disclosure of its full scope or all of its features.

A computer-implemented method is provided for navigating a pedestrian using a mobile phone. The method includes: capturing, by a magnetometer in a mobile phone, data for a magnetic field over time along a path being taken by the pedestrian; determining, by the processor, a number of steps taken by the pedestrian along the path; comparing, by a processor in the mobile phone, the captured magnetic field data with reference data for the magnetic field captured along the path at an earlier time; estimating, by the processor, a relative position of the pedestrian on the path as the pedestrian traverses the path, where the estimation of the relative position is based on the comparison and the number of steps taken by the pedestrian; and issuing, by the processor, a navigation instruction to the pedestrian when the relative position correlates to a particular position along the path at which to issue the navigation instruction.

The method further includes capturing, by an accelerometer in the mobile phone, acceleration data over time along the path being taken by the pedestrian; and determining the number of steps taken by the pedestrian along the path using the acceleration data. In one embodiment, determining the number of steps taken includes detecting peaks in the acceleration data, where each peak detected in the acceleration data correlates to a step.

The method may also include detecting a deviation from the path by the pedestrian and issuing, in response to detecting the deviation, a navigation instruction which advises the pedestrian to change direction along the path.

In an example embodiment, comparison of the captured magnetic field data with the reference data is done using a Dynamic Time Warping algorithm. Because the reference data includes a number of steps taken along the path for each measure of the magnetic field captured along the path, the search space for comparing the captured magnetic data with the reference data may be restricted using the number of steps taken by the pedestrian. Comparing the captured magnetic field data with the reference data further includes computing, for a given cell in a warping cost matrix, a similarity measure between a value of the captured magnetic field data and a value of the reference data; computing a difference between the similarity measure and similarity measures in neighboring cells of the warping cost matrix; and setting value of the given cell in warping cost matrix based on the difference between the similarity measure and similarity measures in neighboring cells.

In some embodiment, changes in elevation along the path can be determined by a barometer in the mobile phone and navigation instructions can be based in part on changes in elevation.

A "last-mile" navigation system is also provided for mobile devices. The navigation system includes: a data store that stores reference data for a magnetic field captured along a particular route; a magnetometer; a trace collection module and a navigation module. The reference data includes a series of measures for the magnetic field along the particular route and a number of steps taken along the particular route associated with each measure of the magnetic field.

The trace collection module is configured to receive an indication that the mobile device is traversing the particular route and to receive input from the magnetometer. In response to receiving the indication that the mobile device is traversing the particular route, the trace collection module captures input from the magnetometer and determines a number of steps taken by user of the mobile device along the particular route.

The navigation module that retrieves the reference data for the particular route from the data store and compares the input from the magnetometer to the reference data. The navigation module further estimates a relative position of the user along the particular route based on the number of steps taken by the user along the particular route and the comparison of the input from the magnetometer to the reference data. In some embodiments, the trace collection module and the navigation module are implemented processor executable instructions executed by a computer processor of the mobile device.

The navigation module cooperatively interacts with an output element to issue a navigation instruction to the user based relative position of the user along the particular route. In some embodiments, the output element is further defined as one of a speaker or a display of the mobile device.

The navigation system may include an accelerometer, wherein the trace collection module is configured to receive input from the accelerometer and operates to determine the number of steps taken by user of the mobile device along the particular route.

The navigation system may further include a barometer, such that the navigation module determines changes in elevation along the particular route using input from the barometer.

The navigation system may also include a route publish module configured to receive reference data for the particular route from a route source external to the mobile device and, in response to receiving the reference data for the particular route, store the reference data for the particular route in the data store.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a diagram showing an example embodiment of a proposed navigation system;

FIGS. 2A and 2B a diagrams illustrating an example indoor navigation scenario;

Corresponding reference numerals indicate corresponding parts throughout the several views of the drawings.

DETAILED DESCRIPTION

Figure 2A:
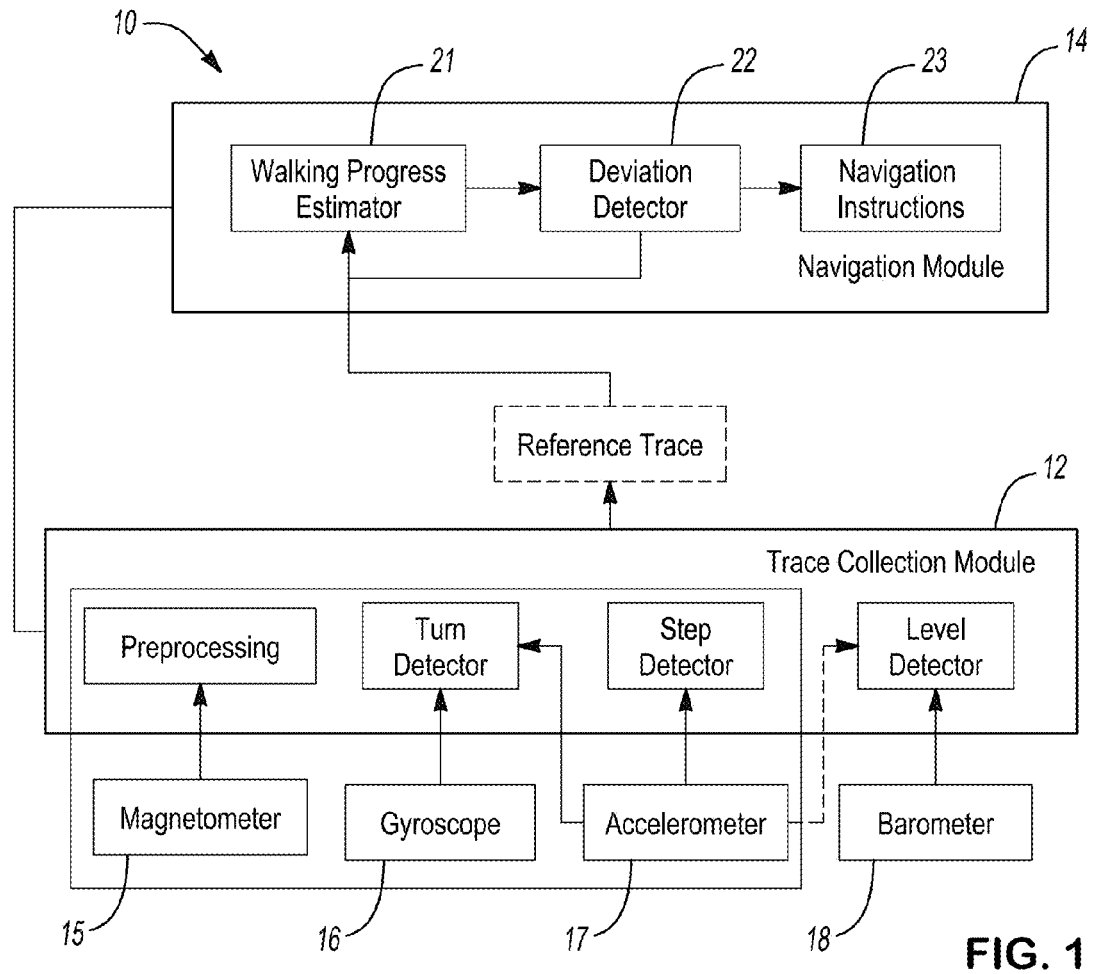

Example embodiments will now be described more fully with reference to the accompanying drawings.

FIG. 1 depicts an example embodiment of a last-mile navigation system 10 implemented in a mobile device, such as a mobile phone. The navigation system 10 is comprised generally of a trace collection module 12 and a navigation module 14. The navigation system 10 receives input from various sensors residing in the mobile device, including but not limited to a magnetometer 15, an accelerometer 16, a gyroscope 17 and a barometer 18. While reference is made throughout this disclosure to a phone, it is understood that the navigation system may be implemented in other types of mobile devices, such as PDAs, laptops, tablets and wearable devices (e.g., watches).

The trace collection module 12 works during the leader's traversal of a path to generate the reference data. To start, the trace collection module 12 is configured to receive an indication that the user of the device is traversing a path of interest. During traversal of the path (and in response to receiving an indication that the mobile device is traversing the particular route), the trace collection module 12 captures/records readings from the magnetometer 15. The trace collection module 12 also captures input from other sensors, including the accelerometer 16, the gyroscope 17 and the barometer 18. The trace collection module 12 in turn launches a series of signal processing, including magnetic data preprocessing, step recognition, turn and level change detection, and generate a reference trace for the path, for example after the leader arrives at the destination. The reference trace contains preprocessed magnetic data and timestamps of step, turns and level changes that are extracted from different sensors. It is understood that the system can leverage combinations of sensors other than those listed for walking pattern recognition. For example, together with a barometer, an accelerometer can help detect whether or not the user is climbing stairs.

The navigation module 14 takes a reference trace as an input and helps followers to navigate from the starting position to the same destination as the leader. Typical starting locations are those where GPS/Google Map stops precise navigation, such as the end of a road or the entrance of a building. Like the trace collection module 12, the navigation module 14 contains a magnetic pre-processor and a step detector which process the data from magnetometer and accelerometer, respectively, during the follower's walking trip. Alternatively, the functionality implemented by the trace collection module 12 can be used to capture the data during the follower's walking trip. In either case, captured data is sent to a walking progress estimator 21 of the navigation module 14.

During the traversal of the path by the follower, the walking progress estimator 21 estimates the portion of the path that the follower has walked relative to the entire reference trace. Based on the estimation results, a deviation detector 22 determines whether the follower is off course. If not, the instruction module 23 provides directions (i.e., make turns, go up/down stairs) to guide the user the destination; otherwise, the instruction module 23 provides instructions to return the user to the path leading to the destination.

Figure 2B:
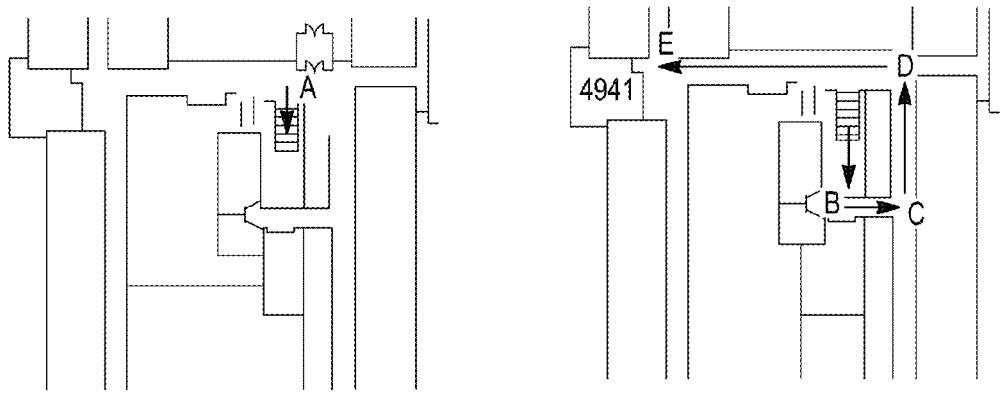

With reference to FIGS. 2A and 2B, suppose a meeting will be held in Room 4941 on the fourth floor of a building and $U_a$ is the coordinator of this meeting. Before the meeting, $U_a$ walks from the building entrance (position A located at the 3rd floor) to the conference room as the arrowed lines show. During his walk, the trace collection module 12 records the geomagnetic data along the route and identifies walking features (i.e., 1 flight of stairs and 3 left turns). Later, a meeting participant $U_b$, who has received the reference trace from $U_a$, arrives at the same entrance. From that point on, the navigation module 14 of the meeting participant's phone will estimate $U_b$'s location relative to the reference trace (i.e., the walking progress) in real time and guide him to Room 4941. The walking progress estimation is made by matching geomagnetic observations of $U_b$ to those from the reference trace. Based on the estimation result, a "go upstairs" icon will appear first, followed by a "left turn" icon when $U_b$ is approaching positions B, C and D. Once $U_b$ reaches location E, the navigation module 14 generates a notification and terminates the navigation process.

Figure 3:
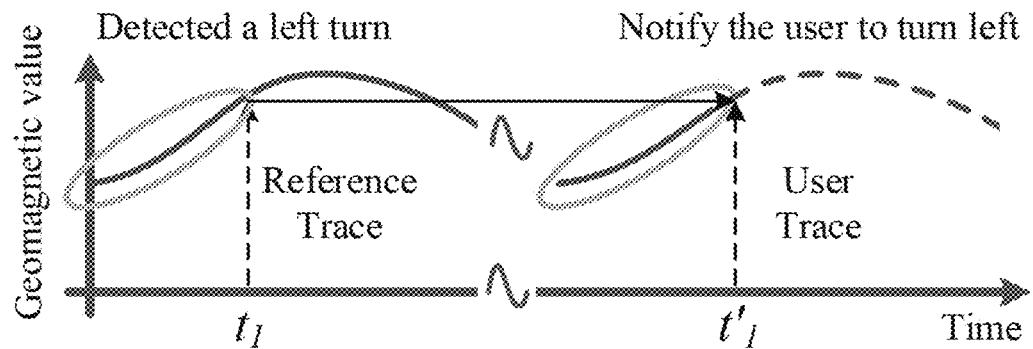
FIG. 3 is a diagram illustrating a walking progress estimation.

FIG. 3 shows how the navigation module 14 works in the time domain. Suppose $U_a$ takes $t_1$ seconds to arrive at position B on the path and makes a left turn during the trace collection. In the navigation phase, based on the similarity of geomagnetic observations (in both ellipses), the navigation module 14 infers that $U_b$ reaches B at time $t'_1$ and hence instructs $U_b$ to turn left.

During the leader's walking, the trace-collection module 12 automatically builds the reference trace by (i) recording geomagnetic readings, which are tuples of timestamps and magnetic values; (ii) detecting steps, turns and level-changes based on readings of the accelerometer, gyroscope and barometer; and (iii) outputting all detection results (timestamps, turn directions, etc.) and geomagnetic readings to a file upon leader's arrival at the destination. An example data format for the reference trace is summarized in Table 1 below.

TABLE 1

| | |
|---|---|
| Geomagnetic data | $m = <t_i, m_i^x, m_i^y, m_i^z>$ |
| Step data | $S = <t_i, s_i>, s_i = 1, 2, 3$ |
| Turn data | $tr = <t_i, tr_i>, tr_i =$ turn degrees |
| Level change data | $l = <t_i, l_i>, l_i = \{up, down\}$ |

Each reference trace is labeled with a (starting point, destination) pair (e.g., from Entrance A to Room 4941). Once the reference trace is generated, the leader can share it with others, for example on the cloud for future navigation purposes. The reference trace can subsequently be retrieved by followers. In other embodiments, the reference trace file can be shared directly with the followers, for example by email or some other communication method.

Note that there could be certain detection delays during use of the proposed navigation system. For example, a peak detection algorithm will incur a step detection delay; turns can only be recognized after the user completes each turn and the response time of level-change detection is subject to the user's climbing speed of the staircase. However, since each step and turn lasts for a short time and the level-change detection works only in the trace-collection module, these delays affect the navigation performance insignificantly.

Since followers will likely walk at different speeds from the leader, and may even stop en route from time to time, a key challenge in the navigation system 10 is to estimate their walking progress. In the navigation phase, the walking progress estimator 21 synchronizes each follower's walking to the reference trace by matching their geomagnetic observations. Based on the estimation results, real-time guidance (i.e., advance notices of turns and level-changes) and an estimated walking time can be displayed to the user of the phone.

Figure 12:
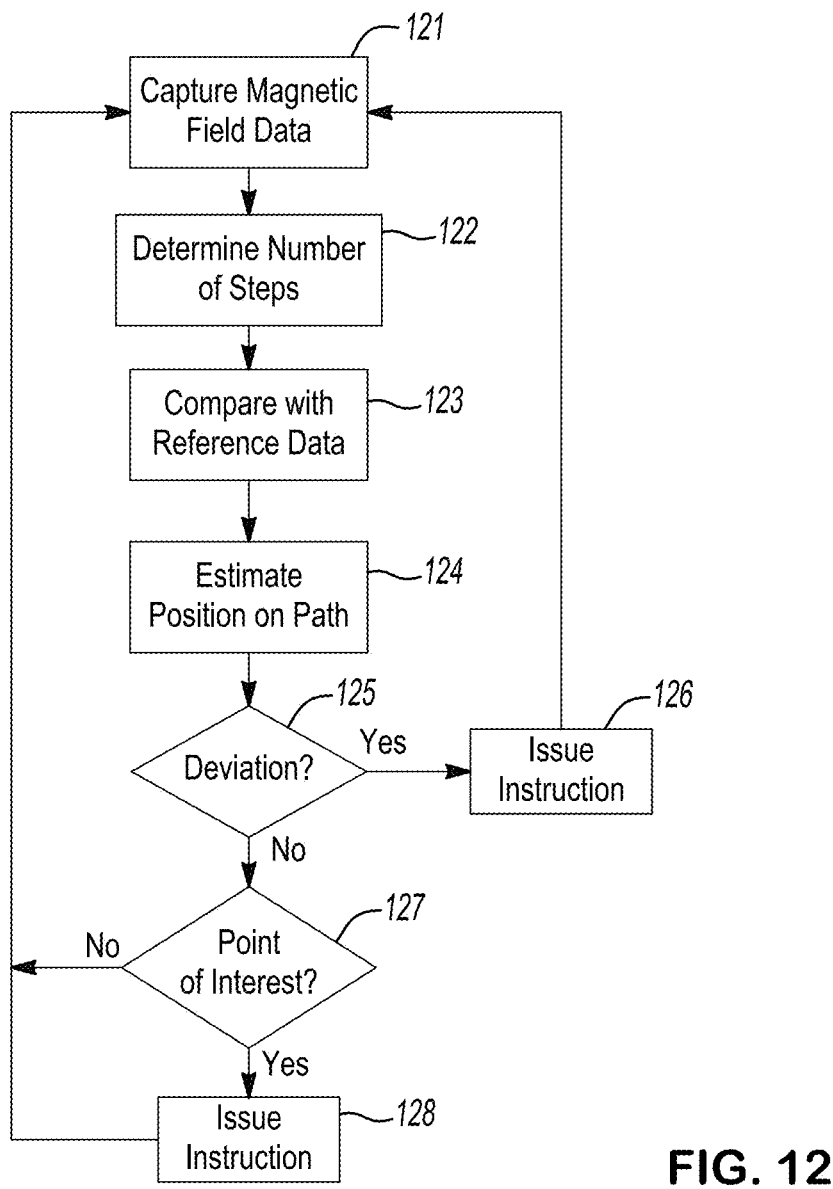
FIG. 12 is a flowchart illustrating example steps implemented by the proposed navigation system to navigate a pedestrian.

FIG. 12 illustrates example steps implemented by the proposed navigation system 10 while navigating a follower along a path or route. Prior to traversing the path, the reference data must be captured by the same or different device and stored on the device being used by the follower while traversing the path. To begin, the follower selects a destination they would like to navigation to. The starting location may also be input by the user or derived from other sensor input, such as GPS data. Based on the designated start/stop pair, the navigation system retrieves the corresponding reference data for path.

While traversing the path, magnetic field data is captured at 121 by the magnetometer of the mobile device. Additionally, acceleration data may be captured over time by an accelerometer as the path is traversed. From the acceleration data, the number of steps taken by the user along the path can be derived at 122 as will be further described below. Other techniques for determining the number of steps taken also fall within the scope of this disclosure.

The captured magnetic field data is in turn compared at 123 with reference data captured along the same path. From the comparison of the magnetic field data and the number of steps taken, a relative position of the user along the path is estimated at 124. In an example embodiment, the comparison is performed using a Dynamic Time Warping algorithm as is further described below. Of note, the search space for comparing the captured magnetic field data with the reference data is constrained using the number of steps taken.

A deviation from the path may be detected at 125. In response to detecting a deviation, the user may be alerted to the deviation, for example by an audible or visual indicator. Further, the navigation system issues a navigation instruction at 126 which advises the user to change direction or otherwise informs how to return to the path. A point of interest, such as a turn, may also be detected at 127, for example when the current position correlates to a particular position in the reference data at which to issue a navigation instruction. Likewise, in response to detecting the point of interest, the user may be issued a navigation instruction at 128. In any case, processing continues in a similar manner until the user reaches the desired destination. It is to be understood that only the relevant steps of the methodology are discussed in relation to FIG. 10, but that other software-implemented instructions may be needed to control and manage the overall operation of the system.

Below we discuss the identified properties of magnetic fields before presenting a walking progress estimation algorithm. Due to its global availability and stability, the geomagnetic field is used in several indoor localization systems. Most of them exploit magnetic field anomalies caused by the local disturbances of ferromagnetic building materials, and localize users/devices based on a pre-established fingerprint map.

Figure 4A:
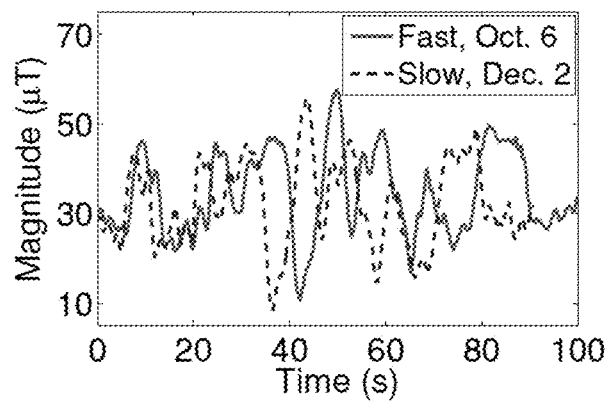
FIGS. 4A and 4B are graphs depicting geomagnetic traces collected during walking.
Figure 4B:
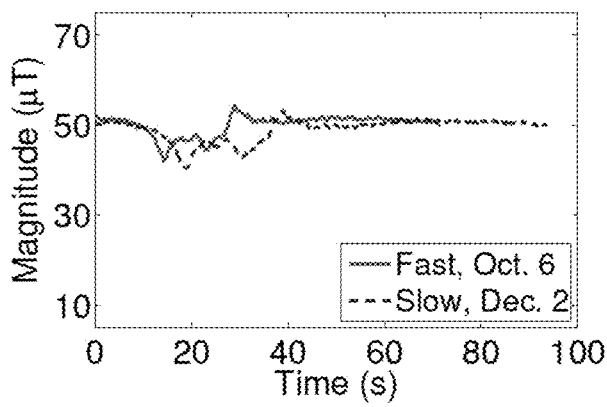

FIGS. 4A and 4B show four magnetic traces in both indoor and outdoor environments, respectively. The traces in each figure were collected during walks along the same path on different dates nearly two months apart. These figures shows that anomalies of the geomagnetic field caused by building construction materials exist in both indoor and outdoor environments and that the magnetic field and the local disturbances are very stable over time as the construction layout remains unchanged. In addition, the impact of mobile objects on the magnetic field is very limited. These local disturbances, stability over time and robustness make the magnetic field a good candidate for trace synchronization in the proposed navigation system.

Note that although the magnetic field is directional and 3D magnetic signals are measured by magnetometer, it is difficult to fully leverage magnetic field readings on three axes, as the frame of reference of the magnetometer may not always align with the global coordinate system. Ensuring that alignment would require either accurately tracking the device's attitude (i.e., orientation or posture) at all times or to constrain the device usage at some fixed attitude (e.g., hand-held horizontally with Y-axis towards heading direction). The former is difficult due to sensor drift and the latter greatly affects users' experiences. Therefore, only the magnitude of the magnetic signal may be used in practice.

Despite its favorable properties, use of the magnetic field poses several challenges. First, the magnetic field is less interfered in outdoor space than indoor space. For example, in FIG. 4B, outdoor magnetic distortions can only be observed when the user passes by buildings. To handle this problem, the navigation system 10 uses a simplified IODetector (only using the magnetism detector) to differentiate outdoor open areas from indoor/semi-outdoor spaces; further information regarding an example IODetector is described by Zhou et. al. in "IODetector: A Generic Service for Indoor Outdoor Detection. In ACM SenSys, 2012. In indoor or semi-outdoor environments, the navigation system 10 leverages a novel step-constrained trace synchronization approach for navigation, while in outdoor open spaces where accurate directions can be obtained by a compass, it uses legacy inertial-sensor-based tracking (i.e., dead reckoning). Since the majority of last-mile navigation problems occur in indoor/semi-outdoor environments, this disclosure will focus on the magnetic-field-based, step-constrained trace synchronization.

Figure 5A:
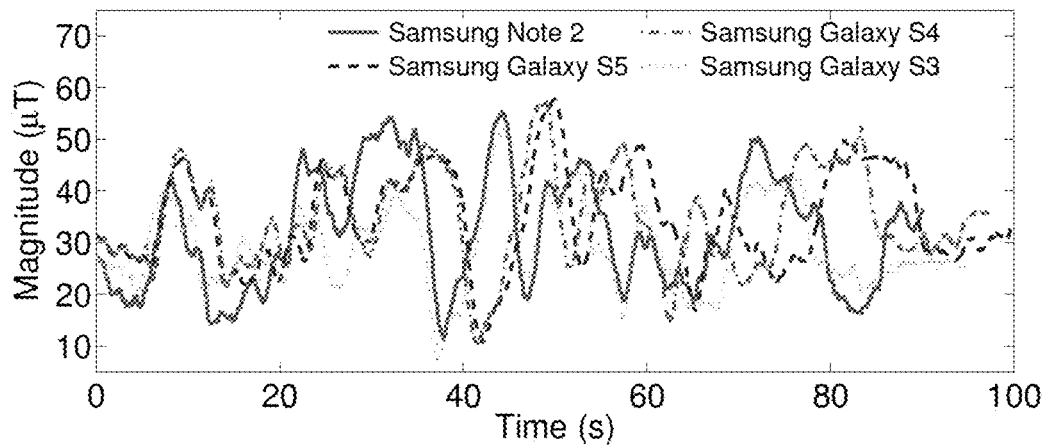
FIGS. 5A and 5B are graphs depicting device diversity and usage diversity, respectively, of magnetic signals taken along the same path.
Figure 5B:
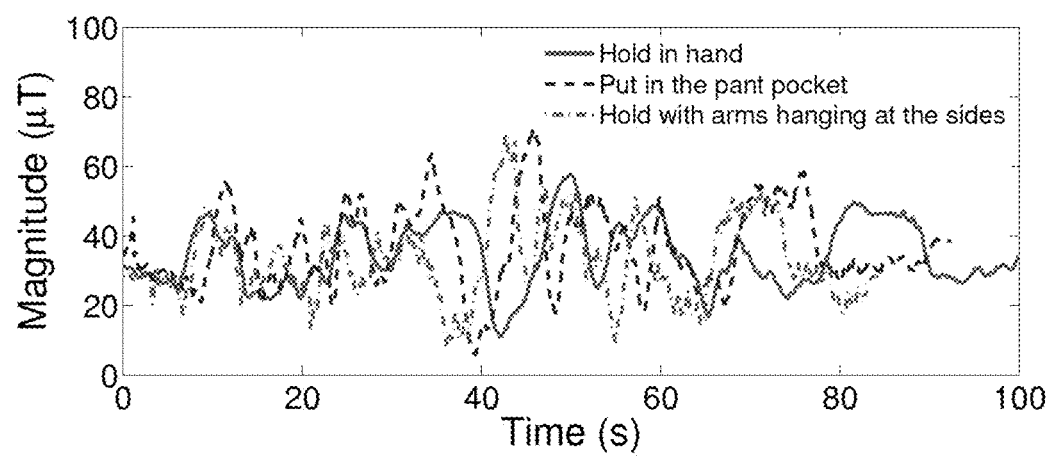

The second challenge is the biased magnetic field measurements caused by device and usage diversities. In other words, different devices will show different readings for the same magnetic field. This is verified in FIG. 5A, showing the magnitude of the collected magnetic signals along the same path using different smartphones. Even for the same device (Galaxy S5), the resulting signal varies from the device's height (as shown in FIG. 5B). However, the trend (i.e., shape) of the measured magnetic field remains consistent across devices and usages, providing opportunities for navigation.

To provide real-time navigation instructions (i.e., for turns, stair-climbing) and estimate the remaining walking time, one needs to know how far the follower has walked relative to the length of the reference trace. For this, a step-constrained trace synchronization algorithm is devised based on Dynamic Time Warping (DTW). The algorithm matches magnetometer readings from the follower's phone to the pre-loaded magnetic field data from the reference trace. While reference is made to Dynamic Time Warping, other types of synchronization methods also fall within the broader aspects of this disclosure.

DTW is a class of algorithms proposed to align and measure the similarity between two time series. Specifically, DTW matches each sample in one time series to one or more samples in another ordered sequence using dynamic programming. The objective of DTW can be stated as: Given two time series $S_a=S_a[i]$, $i=1, \ldots L_a$ and $S_b=S_b[i]$, $i=1, \ldots, L_b$ DTW aims to find a monotonic mapping function f: $I[1, L_a] \rightarrow I[1, L_b]$ between $S_a$ and $S_b$ so as to minimize $\Sigma_{i=1}^{L_a} (S_a[i]-S_b[f(i)])^2$ where $I[1, L_a]$ is the integers from 1 to $L_a$.

Despite its wide usage, DTW cannot be directly applied to synchronize the user and the reference traces for three reasons. First, DTW works offline on two given time series. However, in the navigation system 10, the length of the user trace continuously increases during his walk. Second, DTW maintains a two-dimensional warping cost matrix of which the size is a quadratic function of the number of samples. This incurs an unacceptably high computational overhead on a mobile device, especially when the walking distance gets longer. Third, DTW compares two sequences based on their absolute values. Due to the device and usage diversities, the observations of biased magnetic fields have negative effects on the matching results. Due to the lack of a full picture of the user trace (especially at the beginning of the walk), simple mean-removal techniques cannot solve the problem.

To exploit the advantages of the magnetic field and deal with the above problems, the navigation system 10 proposes a step-constrained trace synchronization algorithm. The algorithm has three main characteristics. First, to deal with device heterogeneity and usage diversity, the high-frequency components of the magnetic field sensing are filtered out and then utilize the differential magnetic field information that is independent of the absolute values. Second, to reduce the computation overhead, a global path constraint is set in DTW based on the step-detection results. This way, the algorithm runs in linearithmic time and similarity scores only are maintained within a certain range of the warping cost matrix, which is also memory-efficient. Third, to obtain a better matching result, the search band in the warping cost matrix is adaptively changed according to the similarities among traces.

Figure 6:
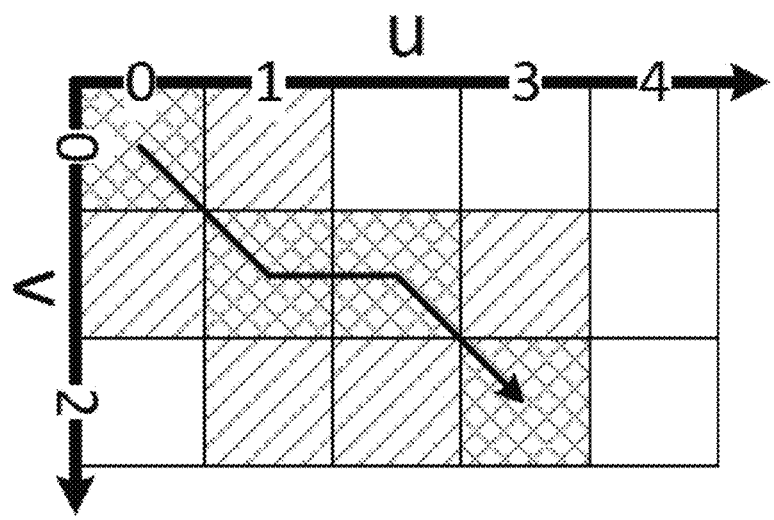
FIG. 6 is a diagram illustrating updating of a warping cost matrix in the step-constrained trace synchronization.

FIG. 6 illustrates an example of the matching process. In particular, FIG. 6 shows a 3×5 warping cost matrix. Entry (i, j) in the matrix indicates the similarity between the (i−1)-th sample in the reference trace u and the (j−1)-th sample in the user trace. In this example, a search band with only a fixed width of two is maintained, hence setting the path constraint coefficient c=2. At the beginning of the process, values of the first $c^2=4$ entries on the northwest corner are computed and the pointer of the matrix $p=(p_v, p_u)$ is set to (1,1). Next, find the entry with the minimal value among all entries that are within the distance of c=2 to the pointer on both $p_v$-th row and $p_u$-th column. For example, find the entry (1,1) is smaller than both (1, 0) and (0,1) entries. Therefore, both $p_v$ and $p_u$ increase from 1 to 2 and (1, 2), (2, 1) and (2, 2) entries are being calculated. Next, find the entry (1, 2) which contains the smallest value among (2,1), (2, 2) and (1, 2) entries. Hence, in the next iteration, only $p_u$ increases (i.e., the pointer moves to the right entry (2, 3)) and (2, 3) and (1, 3) entries are updated.

In this example, all calculated entries are shaded in grey, and the mapped results are also labeled. For example, $f(u_3)=v_2$. This way, the walks of the leader and the follower are synchronized, and can further provide real-time turning and stair climbing instructions when the follower approaches a crossing or stairs or elevators.

Note that in this example, the matrix pointer p is moved based only on matching results. In the example embodiment, a step constraint is also used in the algorithm. The rationale behind the step-constraint is simple: the difference between the number of steps taken by the leader and the follower within a small given physical distance should be bounded. For example, for a 5-meter walk, it is unlikely that the difference of steps taken by two users is as large as 10. Hence, in the algorithm, if $f(u_i)=v_m$ and $f(u_j)=v_n$, we first get the number of steps $s^{lv}$ taken by the leader between $t_m^v$ and $t_n^v$, and compare it with the number of steps $s^{lu}$ taken by the follower between $t_i^u$ and $t_j^u$. Since samples $(u_i, v_m)$ and $(u_j, v_n)$ should be taken at nearby physical positions (if not the same), the difference between $s^{lu}$ and $s^{lv}$ should be bounded. Therefore, if the difference is larger than a predefined threshold, the pointer is moved horizontally/vertically in the next iteration.

Algorithm 1 and 2 illustrate an example embodiment for the the detailed step-constrained online trace synchronization algorithm.

---

ALGORITHM 1

```
Input   :  reference trace v = {t^v,m^v,s^v,tr^v,l^v}
Output  :  uv where uv_i = j indicates the i-th sample in u maps to
           the j-th sample in v
1  p_u = 0, p_v = 0, P_u^inc = true;
2  for each sample m_i^v ∈ m^v do
3      m_i^vp = MagPreprocess (m_i^v);
4  end
5  while p_v ≤ size(v) do
6      if p_u^inc then
7          uv_i = arg min D [k][p_u], k ∈ [p_v − c, p_v];
8          for each observation u_i do
9              get a_i^u, m_i^u;
10             s_i^u = StepDetection (a^u);
11             m_i^up = MagPreprocess (m_i^u);
12         end
13     end
14     if DirInc (p_u,p_v) ! = IncColumn then
15         P_v + +;
16         p_u^inc = false;
17         for j = p_u − c; j ≤ p_u; j + + do
18             D[p_v][j] = min (D[p_v − 1][j − 1], D[p_v − 1][j], D[p_v]
                   [j − 1]) + (m_{p_u}^up − m_{P_v}^vp)^2;
19         end
20     end
21     if DirInc (P_u,p_v)! = IncRow then
22         p_u + +;
23         p_u^inc = true;
24         for j = p_u − c; j ≤ p_u; j + + do
25             D [j][p_u] = min(D[j − 1][p_u − 1], D[j − 1][p_u], D[j][p_u − 1]) +
                   (m_{p_u}^up − p_v)^2;
26         end
27     end
28  end
```

At first, Algorithm 1 imports reference trace v and pre-processes the magnetic field trace mv at line 3. The function MagPreprocess computes the magnitude, smooths the data through a low-pass filter and calculates the difference between neighboring magnitude values. The matching continues running until the user reaches the destination (lines 5-28). In the main loop, if a new column was calculated ($p_u^{inc}$==true) in the previous iteration, the algorithm calculates and outputs the matching result uv, and then reads a new sample (see, lines 8-12). Between line 14 and 27, the algorithm calculates a partial row or column of the warping cost matrix D (i.e., compare magnetic field values and compute similarities). The computation is based on standard DTW recursion formula (as seen at lines 18 and line 25), restricted to using only the entries which have already been computed. In this example embodiment, the search band is updated in each iteration according to the function DirInc set forth below.

---

ALGORITHM 2

```
1   Function DirInc (p_u,p_v)
2       if i ≤ cIni then
3           return IncBoth;
4       end
5       given uv_i = k, calculate
6       vSteps = s_k^v − s_k^v where t_k^v − t_k^v = t_w;
7       uSteps = s_i^u − s_i^u where uv_{i'} = k';
8       if uSteps + StepBound ≤ uSteps then
9           return IncRow;
10      end
11      if uSteps − StepBound ≥ uSteps then
12          return IncColumn;
13      end
14      (m,n) = arg min (D[x][y]) where
               x = p_v, y ∈ [p_u − c + 1, p_u] or
               y = p_u, x ∈ [p_v − c + 1, p_v]
15      if m < p_v then
16          return IncColumn;
17      end
18      if n < p_u
```

ALGORITHM 2

```
19      return IncRow;
20   else
21      return IncBoth;
22   end
23 end
```

To determine the forward direction, function DirInc in Algorithm 2 first checks the step conditions between line 8 and 13. Specifically, given the current pointer location ($p_v$, $p_u$), first extract the last $t_w$-second walk and the corresponding number of steps taken by the leader. Based on the synchronization results between traces u and v, identify the time taken by the follower to complete this distance. Finally, compare the numbers of steps taken by the leader and the follower (line 8-13). If vSteps is much less than uSteps, the row number increases (line 9); if uSteps is much less than vSteps, the column number increases (line 12). If the step condition is satisfied, the algorithm sets the forward direction based on the position of the minimal similarity scores (lines 14-22). If the local minimal cost is achieved at $D[p_v][p_u]$, both the row and the column numbers increase. If it is on the $p_v$-th row, the row number increases, else the column number increases. In the current embodiment, the navigation system 10 empirically sets $t_w$=2 and Step Bound, =3.

Figure 7:
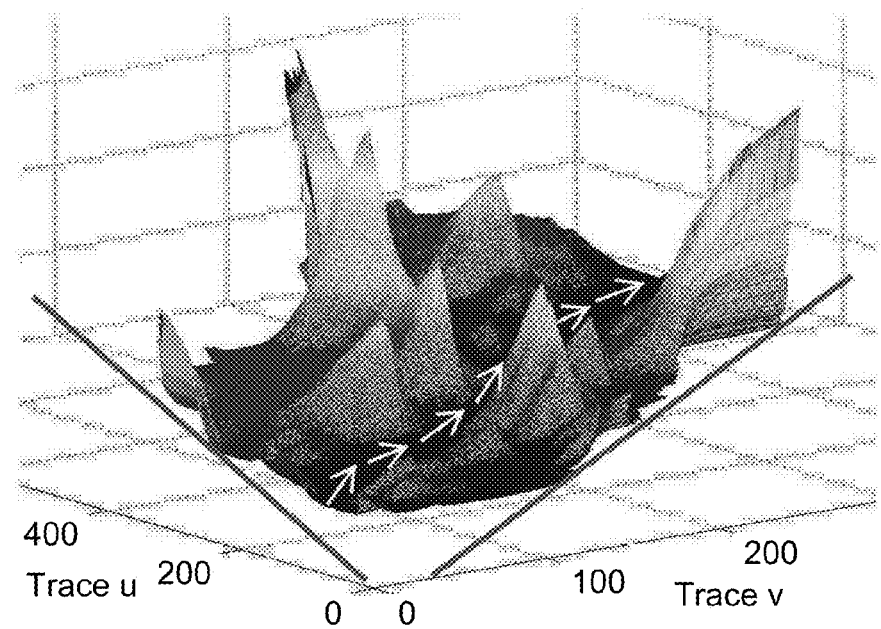
FIG. 7 is a three-dimensional plot of a warping cost matrix.
Figure 8A:
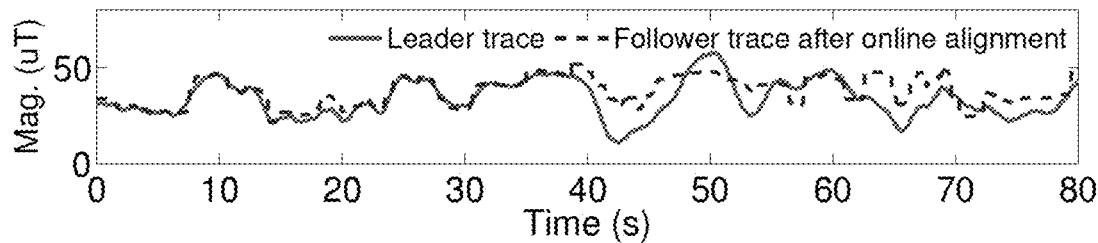
FIGS. 8A-8C are graphs showing deviation detected using dynamic time warping.
Figure 8B:
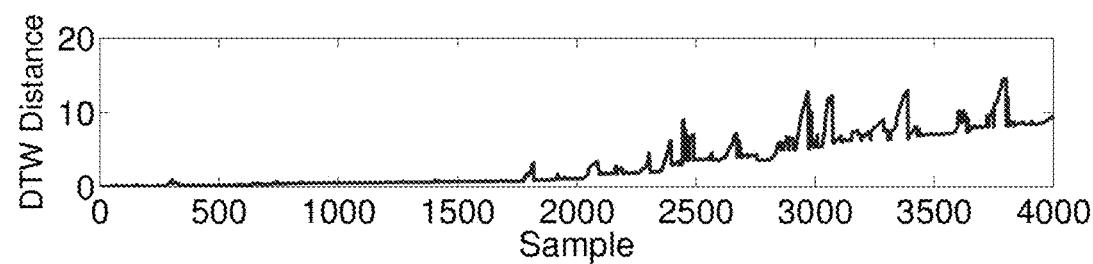
Figure 8C:
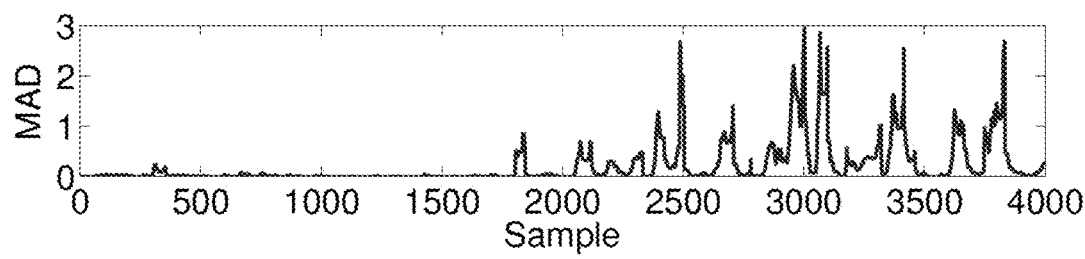

FIG. 7 shows a snapshot of the warping cost matrix during the execution of Algorithm 1. The valley in the center of this figure (the arrows) is the optimal warping path. One can see that the algorithm dynamically changes the search band and calculates entries only within a certain range of the band (i.e., between the two red lines). To quantify the computational overhead, the algorithm was run offline on a PC and Galaxy S5 using traces with different lengths with the running time recorded in Table 2. The linear relation between the trace length and the running time proves the effectiveness of the algorithm.

TABLE 2

| # of samples | 1000 | 2000 | 3000 | 4000 | 5000 |
|---|---|---|---|---|---|
| PC | 1.28 | 4.17 | 6.96 | 9.83 | 12.51 |
| Smartphone | 8.21 | 12.85 | 18.12 | 23.29 | 27.96 |

In spite of advance notice of turns and level-changes provided by the proposed navigation system 10, users might still accidentally miss a turn or go off the user's trace on purpose (e.g., to see something interesting along the way). To handle this problem, the navigation system 10 includes a deviation detector 22 which performs the following tasks. First, it automatically detects if the user goes off the path. When this happens, it notifies the user to make a U-turn and navigates him back to the correct path. For example, the navigation system 10 may replay (in the reverse direction) turning or stair climbing actions the user took on the display of the mobile device. When to display these instructions is computed by the walking progress estimator 21, which synchronizes the geomagnetic observations before and after the U-turn. Note that the reverse navigation component can also be used to guide the user back to a previously visited place. Since the reverse navigation works the same as the normal forward navigation, in what follows the focus is on deviation detection.

Deviations are detected by tracking similarities of geomagnetic observations from the reference and the user traces. The rationale behind this is simple: different paths possess distinct patterns of geomagnetic intensity. To this end, the navigation system 10 keeps monitoring the warping cost matrix D during the trip and uses the median absolute deviation (MAD), which is a robust measure of the variability of a univariate sample of quantitative data, to quantify the increase of DTW distance.

Step information of both the leader and the follower is used in the walking progress estimator to navigate users. The navigation system 10 recognizes user steps based on readings from the accelerometer. Since the maximum amplitudes along all 3 axes of the accelerometer occur when the heel strikes the ground, a peak recognition algorithm is used to detect these strikes/steps. To make the step detection independent of the phone's orientation, only the magnitude of the 3-axis acceleration reading (i.e., $a=\sqrt{ax^2+ay^2+az^2}$) is considered.

The signal magnitudes first pass through a smoothing filter in the preprocessing step. To extract better the low-band step component, a low-pass filter is then applied to filter out high-frequency accelerations caused by the phone's random movement. The low-band component of the acceleration magnitude is calculated online using the following first-order difference equation:

$$a_i^l + a_{i-1}^l + \alpha \times (a_i - a_{i-1}^l) \quad (1)$$

where $a_i$ is the i-th original acceleration magnitude and $a_i^l$ is the value after passing through the low-pass filter. In the example embodiment, the default value of $\alpha$ is set to 0.25.

After the low-pass filter, a peak recognition algorithm with a sliding window is used to detect peaks in the filtered data. Specifically $a_i^l$ is recognized as a peak (i.e., a user step) if it is larger than all samples located in the range of $$\left[ t(i) - \frac{t_w}{2}, t(i) + t_w/2 \right].$$

Since the user step frequency is in general lower than 3 Hz, the window size $t_w$ in the current implementation is set to 0.3 s.

Figure 9A:
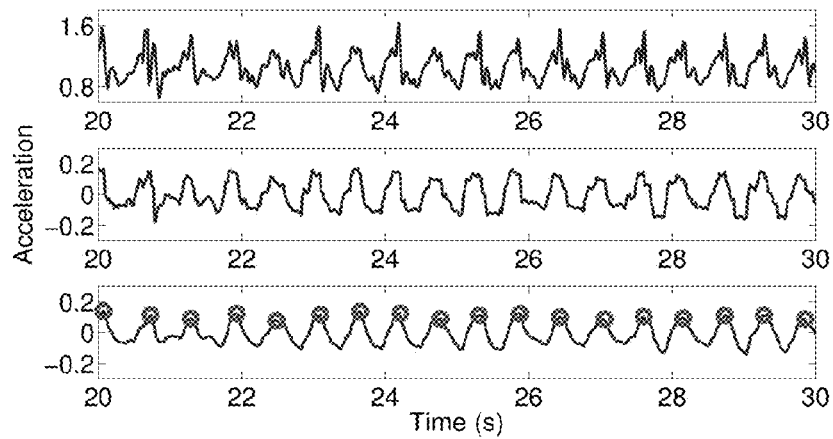
FIGS. 9A and 9B are graphs showing acceleration data for use in step detection.
Figure 9B:
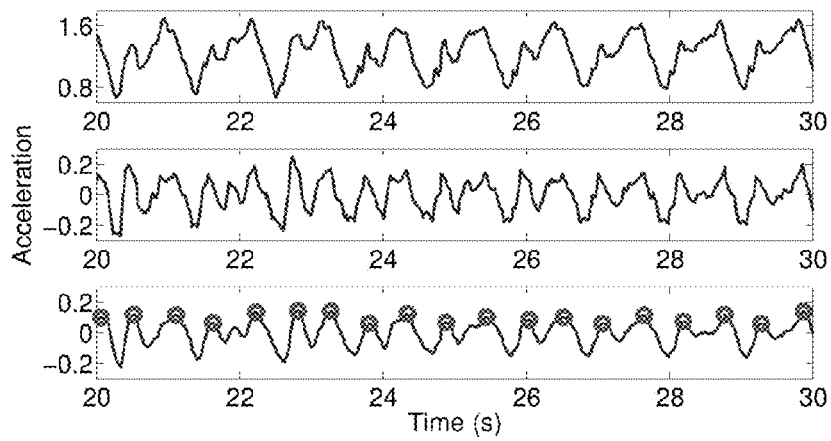

FIGS. 9A and 9B show the processing of acceleration signals. In both figures, the first row displays the original acceleration output from the smartphone, while the smoothed acceleration data and the corresponding low-band component are shown in the second and third rows, respectively. Recognized peaks are highlighted in the third row in red dots. Thus, the step detection algorithm is shown to perform well even when the user swings his arm with the phone in hand.

In outdoor environment, turn information can be extracted from the electronic compass. However, due to ferromagnetic interference, reliable direction output cannot be obtained from the compass in indoor environments. Thus, in indoor environments, turns are detected by jointly considering signals from the accelerometer and the gyroscope to exploit their relative strengths: gyroscope readings can be integrated to produce angle estimates that are reliable over a short term; whereas, the accelerometer suffering from random vibrations can be trusted over a long term to provide attitude estimation.

Turn detection is achieved based on the fact that the rotation axis of the body during a turn is always directed toward the center of the Earth (i.e., in the direction of gravity). In other words, users as well as smartphones always rotate around the Z-axis of the local vertical, local horizontal (LVLH) frame. Since the gyroscope measures the angular velocities of rotation on each axis of the smartphone's body frame, the attitude of the smartphone is first determined using the value of gravity on 3 axes of the accelerometer on the phone's body frame, and then the angular velocity is transformed from the body frame to the LVLH frame to determine turns.

In the example embodiment, a rotation matrix is adopted to describe the orientation of the smartphone from the LVLH frame to its body frame. For brevity, detailed derivations of frame transformation are omitted here. Note that due to the lack of reliable compass reading, the phone's attitude is confined to a conical surface in the LVLH frame and cannot be uniquely identified. However, without the need for the yaw angle $\psi$, one is still able to detect turns because the rotation always happens about the Z-axis in the LVLH frame. In addition, to avoid the Gimbal Lock problem, one needs to be cautious about the rotation sequence of three axes. As turn detection is independent of Z-axis, a simple solution is to exchange the X-axis and Y-axis (i.e., change from the right-hand coordinate system to the left-handed coordinate system) if the gravity acceleration factor on X-axis is larger than that on Y-axis. Once the smartphone attitude is obtained, the angular velocity is transformed and the amount of rotation is computed via integration.

Figure 10:
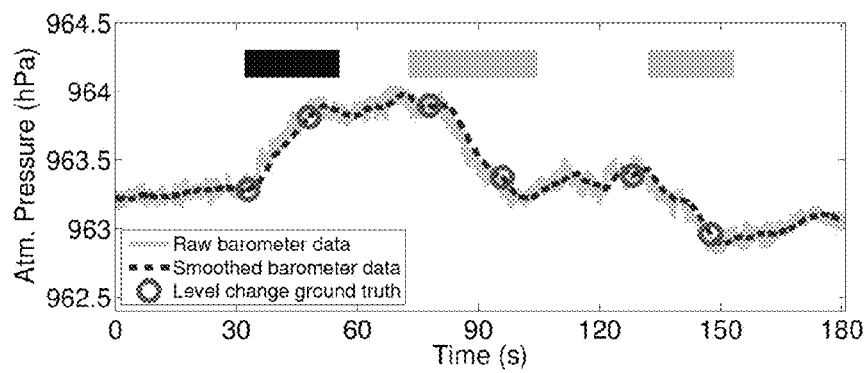
FIG. 10 is a graph depicting data processing of barometer data for level change detection

Due to its low power and excellent relative accuracy, a barometer can be used in the proposed navigation system for level-change detection. FIG. 10 shows a barometer trace collected during a user's walk from the third floor to the second and then climbing up to the fourth floor. Timestamps are also recorded when the user starts walking on the stairs and arrives at a new level as the level-change ground truth. In this figure, one can clearly see the increase/decrease of the atmospheric pressure when the altitude changes.

In an example embodiment, a two-pass bi-directional searching algorithm is used to detect level-changes. In this algorithm, first smooth each atmospheric pressure data $p_n$ by averaging all samples within the previous 4 seconds (as the dark curve in FIG. 10). The algorithm then traces back to find the maximal difference between $p_n$ and samples collected within the last $T_0$ seconds. If a gap $|p_n-p_m|$, indicating a level change, is greater than the threshold $p_{tr}$, conduct a forward search afterwards to determine the altitude-changing period. The algorithm outputs a value ($r_l$=-1/1) or not ($r_1$=0). Particularly, if less than five steps are taken by the user during the level-change period, an elevator up/down is recorded. A sample detection result of level changes is shown above the curves in FIG. 10. In this figure, the dark area refers to the duration when the user is walking downstairs, and the light area indicates walking on an upward staircase. From this figure, one finds the detected stair walking periods fit the ground truth well.

In an example implementation, the proposed navigation system 10 is implemented on a Samsung Galaxy S5 running Android (version 4.4.2). In both the reference trace-collection mode and the navigation mode, the navigation system 10 runs two threads: one for sensory data collection (e. g. using callback function onSensorChanged( )) and the other to take care of the signal processing asynchronously. The sensor data is down-sampled at 50 Hz to reduce the computation overhead of the smartphone. The reference trace is saved to the internal storage shared between these two modes. For the walking progress estimator, the path constraint coefficient is set to c=600 and clni=200.

Figure 11:
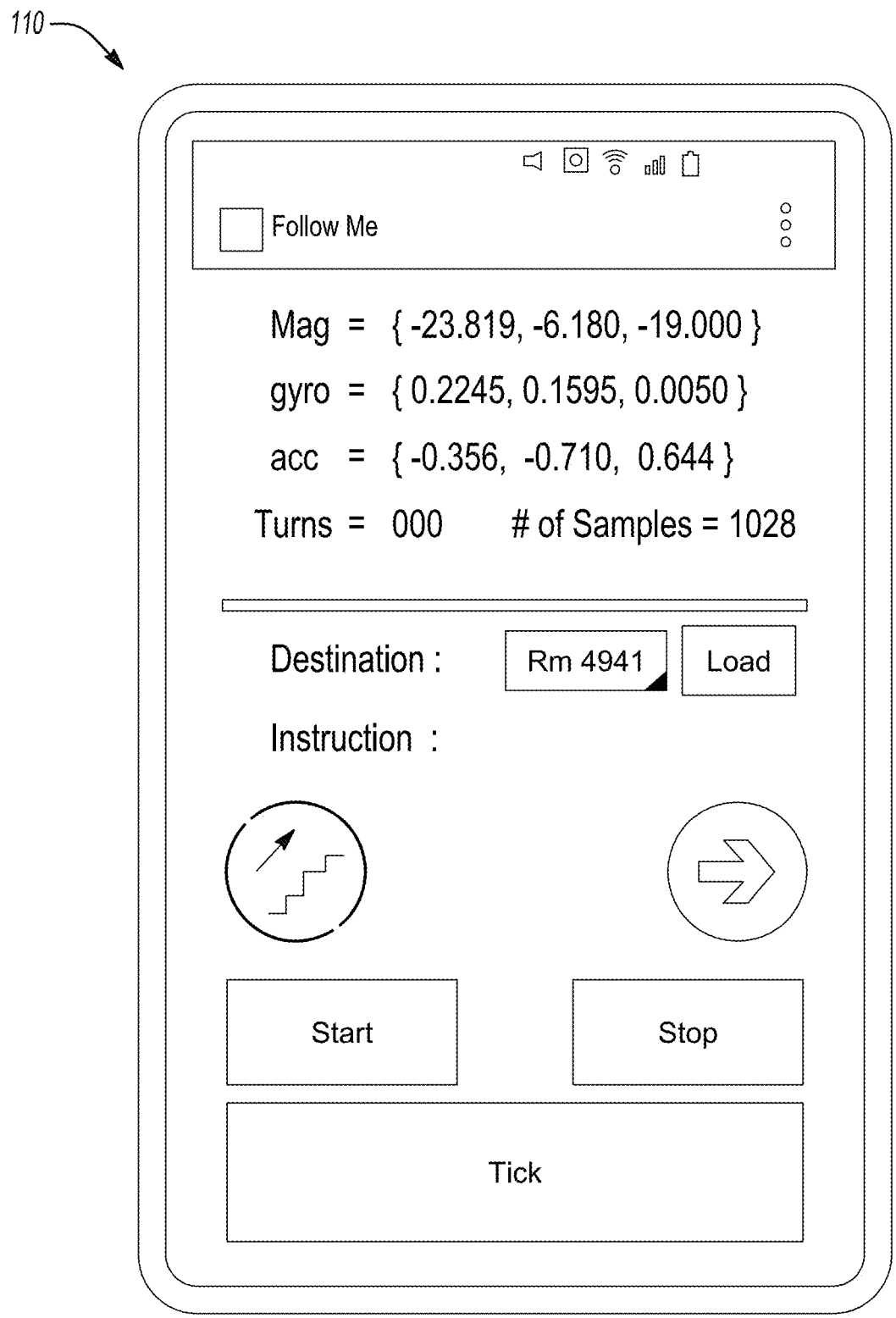
FIG. 11 is an example user interface which may be used in the proposed navigation system.

FIG. 11 shows an example user interface 110 for the navigation system 10 where navigation instructions are provided: after loading the reference trace and pressing the start button, turning instructions are updated on the right of the screen (the turn icon) during user walk. The follower is allowed to walk at different speeds and even stop anytime during the walk. If the follower is required to walk up/down stairs, a staircase icon shows up on the left of the screen.

For evaluation purposes, experiments were conducted in a 4-story campus building with the testing area of 2000 m$^2$. Five users participated in the evaluation of the performance of detection of steps, turns, level-changes, and navigation, including trace-synchronization accuracy, timeliness of navigation instructions and deviation-detection performance. To evaluate the performance of navigation, ten different reference traces were generated by randomly selected users who held their phones in front of their bodies. However, no constraints were imposed on the phone's orientation (e.g. holding the phone horizontally or vertically) during trace collection and navigation. Although the navigation system does not perform level-change detection in the navigation mode, data was recorded from the barometer, accelerometer and gyroscope, and detection algorithms were run offline for the purpose of evaluation.

Figure 13:
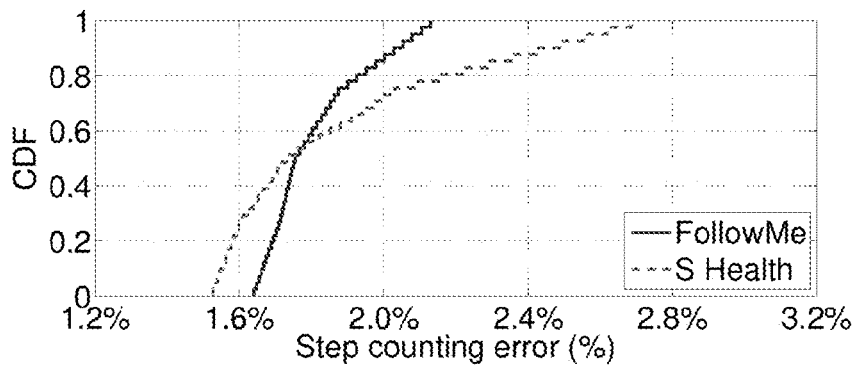
FIG. 13 is a graph depicting performance of step detection.

FIG. 13 shows the step-counting errors. In this figure, the error of the pedometer in S Health is compared to a built-in fitness application in Galaxy S5. The figure shows that application achieves comparable step-counting to S Health. The error of the application is below 2.2% which indicates the step-counting error per 100 steps is less than 3 steps. In the navigation module of the system 10, such a small error can be compensated for by matching the geomagnetic field features.

Figure 14:
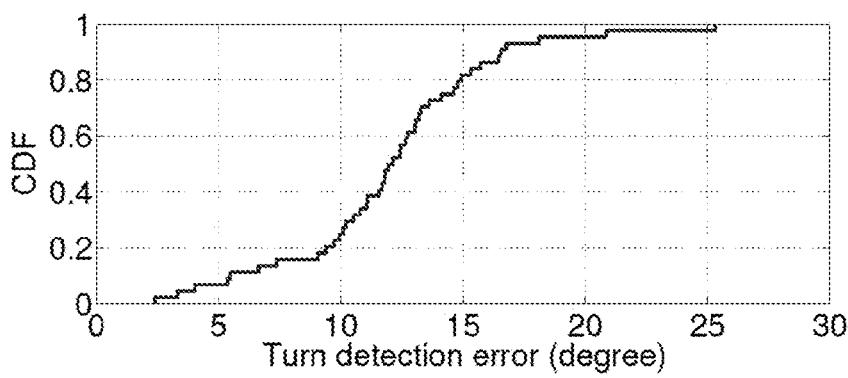
FIG. 14 is a graph depicting performance of turn detection.

FIG. 14 plots the turn-detection results. Specifically, the ground-truth angles of turns are obtained on each test path using the floor plan, and then compared with the turns detected by the trace collection module 12. From FIG. 14, one finds that the turn-detection component achieves a 90 percentile accuracy of 15°. This error is caused by two factors. First, the actual angle of the user's turn may not be identical to that of the path. Second, the accelerometer and gyroscope are susceptible to perturbation which can also lower accuracies.

Figure 15:
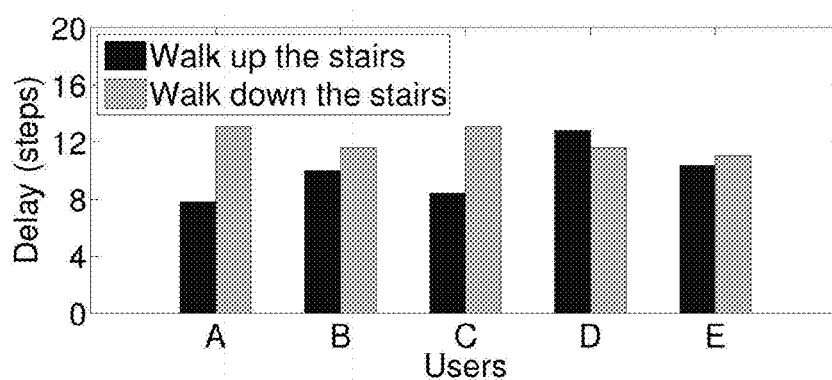
FIG. 15 is a graph showing the delay in level-change detection.

These experiments show 100% accuracy in detecting level-changes. To examine another detection performance metric, FIG. 15 plots the delay in detecting level-changes. Due to subtle pressure changes, detection of level-changes took more time than both step and turn detections. For example, the average delay of detecting walking downstairs is 12 seconds. Since the level-change detection works in the trace-collection module 12, the relative large delay has little influence on the navigation performance.

Next, consider the real-time navigation performance. First, the ground truth locations of the leader are recorded at different times in the trace-collection process. During the follower's walk, the navigation system 10 compared the instantaneous magnetic field measurements and the data collected by the leader to estimate the follower's relative position. In this way, one can measure the offset between the follower's true locations and the locations obtained by the matching algorithm. For the purpose of comparison, the tracking algorithms are implemented using the geomagnetic field or WiFi as benchmarks. Both approaches take a fingerprint map and the floor plan as inputs, and use particle filtering (PF) to continuously estimate the device's location.

Step and turn detection algorithms in the navigation system are also leveraged for particle movement and weight updating.

Figure 16:
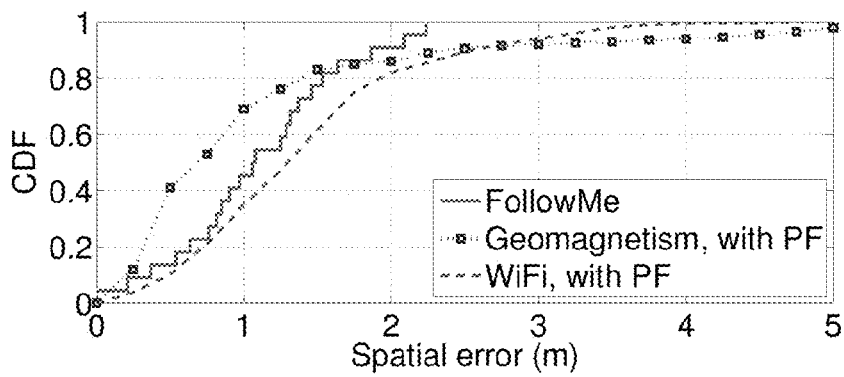
FIG. 16 is a graph showing the spatial error in the proposed navigation system.

FIG. 16 plots the spatial errors of navigation system 10. This figure shows that the spatial errors are less than 2.5 m in system. Compared to benchmarks, one finds that the navigation system 10 outperforms the WiFi-based tracking and achieves a comparable 80 percentile tracking accuracy with the geomagnetic-based algorithm. In addition, the maximal spatial error of the navigation system 10 is smaller than both of the other two approaches. This is because the one-dimensional trace synchronization intrinsically limits the search space, thus reducing the estimation error.

Figure 17:
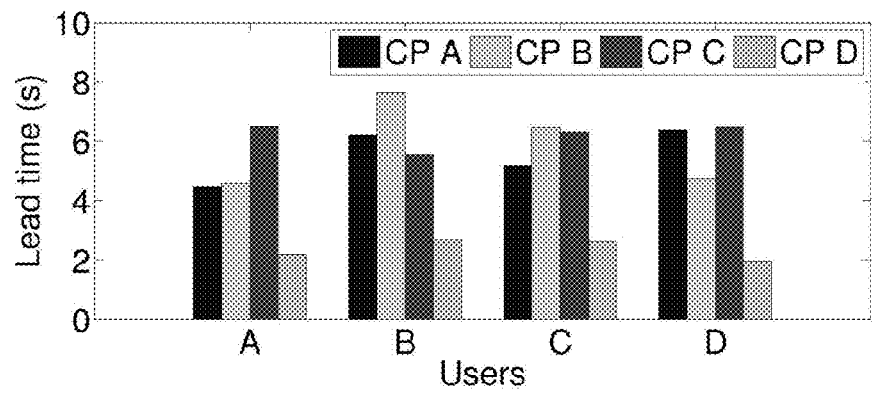
FIG. 17 is a graph showing the lead time of navigation instructions.

FIG. 17 examines further the timeliness of navigation instructions and plots the lead time of the instructions at different checkpoints (i.e., crossings and staircases). One finds that most navigation instructions are provided 4 seconds ahead of the action. However, for the checkpoint (CP) D, the average lead time of the notification is around 2 seconds, since it is close to a previous turn.

Figure 18:
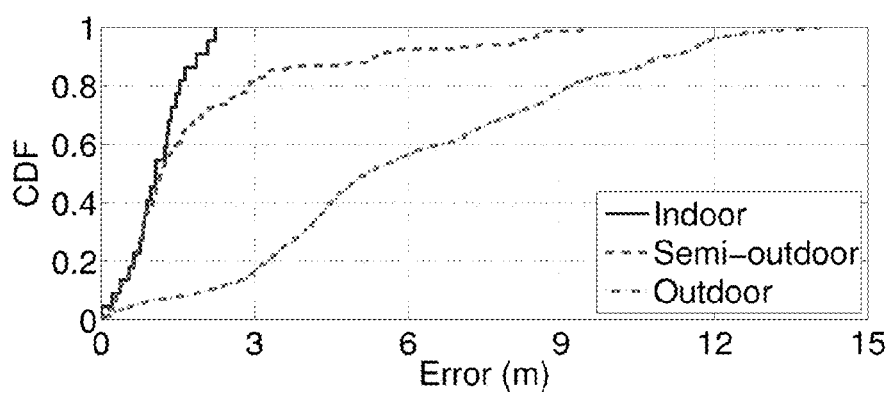
FIG. 18 is a graph showing the tracking error of the walking progress estimator.

Experiments were also conducted in semi-outdoor and outdoor open spaces to evaluate the navigation performance of the navigation system 10. FIG. 18 plots the CDF of spatial error in all three environments. The proposed navigation system 10 is shown to perform best in indoor environments, where 95% of the absolute spatial errors are less than 2 m. However, in outdoor open spaces, only 50% of the errors are within the range of 5 m and the error can be as large as 14 m. This is due mainly to the unobservable geomagnetic anomalies in outdoor open space.

Figure 19:
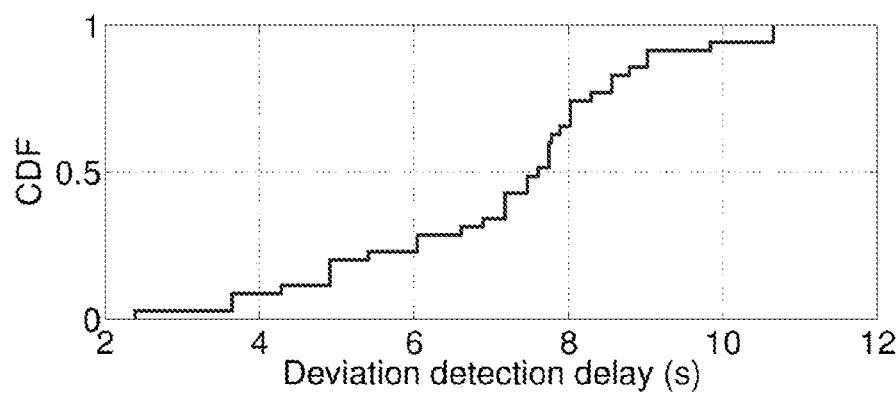
FIG. 19 is a graph showing the delay in deviation detection.

FIG. 19 shows the CDF of detection delay. As shown, all deviations were successfully detected in 11 seconds. In fact, in 60% of cases, it took 7-9 seconds for the navigation system 10 to discover a divergence.

To measure power consumption of the proposed navigation system 10, a Monsoon Power Monitor is used as a power supply for the smartphone which tracks both current and voltage. During the experiment, all background applications are turned off as well as extra hardware components, such as WiFi, GPS, etc.

Figure 20A:
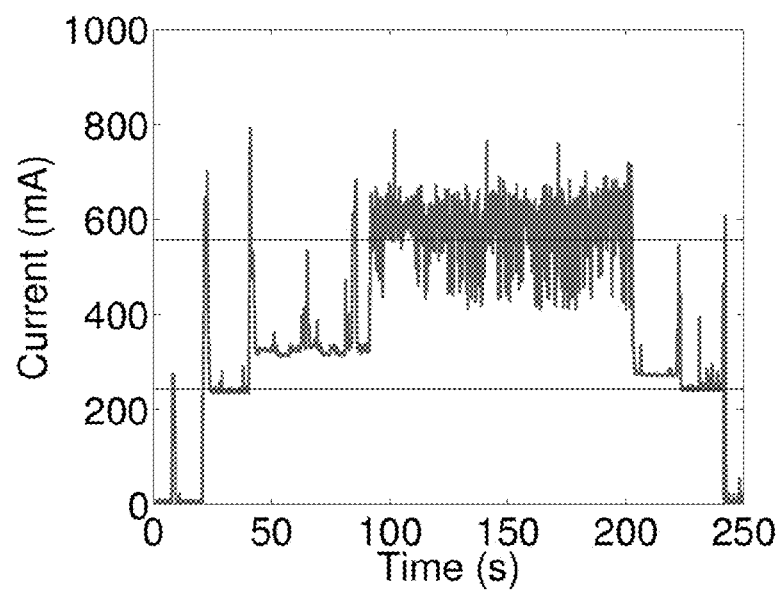
FIGS. 20A and 20B are graphs depicting power consumption for the proposed navigation system.
Figure 20B:
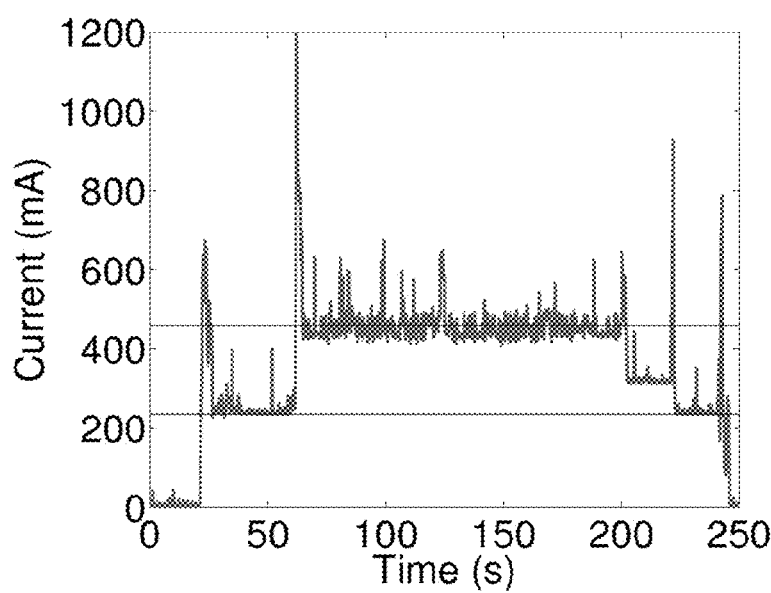

Runtime current measurements for the navigation system 10 are plotted in FIG. 20. In FIG. 20A, the smartphone is in sleep mode during the period from 0 to 20 s. The navigation system 10 begins to run at 40 s and loaded the reference trace at around 65 s. The navigation module started at 90 s and continued running until 200 s. The navigation system was turned off at 220 s. In the trace-collection phase, the module started running at 60 s and stopped at 200 s, as shown in FIG. 20B.

FIG. 20 shows that the runtime currents of the navigation system are 303.4 mA and 224.6 mA in navigation and trace-collection phases, respectively. Thus, the navigation system achieved energy savings of nearly 50% (224.6 mA vs. 433.4 mA) in the trace-collection phase and 15% (303.4 mA vs. 349.5 mA) in the navigation phase. This is because the proposed navigation system does not use energy-hungry sensors, such as WiFi and the camera, but instead the lightweight step-constrained trace synchronization algorithm.

In this disclosure, the geomagnetic field was exploited to synchronize the reference trace and the follower's trace. While enjoying the pervasiveness and stability of geomagnetic field, the proposed navigation system 10 faces several ensuing problems. For example, the weak geomagnetic disturbances impair the usability of the system in outdoor open spaces. It is envisioned that more location-specific signals can be incorporated and a mixed modality used for walking progress estimation. For example, one can jointly consider the geomagnetic intensity and GSM/FM signal strength and synchronize multiple traces. In indoor environments, opportunistically-sensed WiFi can also be fused with geomagnetic signals. Even for a given specific type of location feature, we can synchronize multiple traces that have the same destination, thus automatically determining the user's starting point according to their similarities.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein such as a mobile phone. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for navigating a pedestrian using a mobile phone, comprising:
   capturing, by a magnetometer in a mobile phone, data for a magnetic field over time along a path being taken by the pedestrian;
   determining, by the processor, a number of steps taken by the pedestrian along the path;
   comparing, by a processor in the mobile phone, the captured magnetic field data with reference data for the magnetic field captured along the path at an earlier time and restricting a search space for the comparison using the determined number of steps taken by the pedestrian, where the reference data includes a number of steps taken along the path for each measure of the magnetic field captured along the path;
   estimating, by the processor, a relative position of the pedestrian on the path as the pedestrian traverses the path, where the estimation of the relative position is based on the comparison and the number of steps taken by the pedestrian; and
   issuing, by the processor, a navigation instruction to the pedestrian when the relative position correlates to a particular position along the path at which to issue the navigation instruction.

2. The method of claim 1 further comprises capturing, by an accelerometer in the mobile phone, acceleration data over time along the path being taken by the pedestrian; and determining the number of steps taken by the pedestrian along the path using the acceleration data.

3. The method of claim 1 wherein determining the number of steps taken includes detecting peaks in the acceleration data, where each peak detected in the acceleration data correlates to a step.

4. The method of claim 1 further comprises comparing the captured magnetic field data with the reference data using a Dynamic Time Warping algorithm.

5. The method of claim 1 wherein comparing the captured magnetic field data with the reference data includes
   computing, for a given cell in a warping cost matrix, a similarity measure between a value of the captured magnetic field data and a value of the reference data;
   computing a difference between the similarity measure and similarity measures in neighboring cells of the warping cost matrix; and
   setting value of the given cell in warping cost matrix based on the difference between the similarity measure and similarity measures in neighboring cells.

6. The method of claim 5 further comprises issuing the navigation instruction based in part on changes in elevation.

7. The method of claim 1 further comprises determining, by a barometer in the mobile phone, changes in elevation along the path.

8. The method of claim 1 further comprises detecting a deviation from the path by the pedestrian and issuing, in response to detecting the deviation, a navigation instruction which advises the pedestrian to change direction along the path.

9. The method of claim 1 further comprises capturing the reference data prior to the step of capturing data for a magnetic field, wherein the reference data includes a value for the magnetic field captured along the path and an associated number of steps taken along the path when the value for the magnetic field was captured.

10. A navigation system for mobile device, comprising:
    a data store that stores reference data for a magnetic field captured along a particular route;
    a magnetometer;
    a trace collection module configured to receive an indication that the mobile device is traversing the particular route and to receive input from the magnetometer, wherein the trace collection module, in response to receiving the indication that the mobile device is traversing the particular route, captures input from the magnetometer and determines a number of steps taken by user of the mobile device along the particular route;
    a navigation module that retrieves the reference data for the particular route from the data store and compares the input from the magnetometer to the reference data and restricts a search space for comparing the input from the magnetometer to the reference data using the number of steps taken by the user of the mobile device along the particular route, wherein the navigation module estimates a relative position of the user along the particular route based on the number of steps taken by the user along the particular route and the comparison of the input from the magnetometer to the reference data, wherein the trace collection module and the navigation module are implemented by processor executable instructions executed by a computer processor of the mobile device.

11. The system of claim 10 wherein reference data includes a series of measures for the magnetic field along the particular route and a number of steps taken along the particular route associated with each measure of the magnetic field.

12. The system of claim 11 wherein the navigation module cooperatively interacts with an output element to issue a navigation instruction to the user based relative position of the user along the particular route.

13. The system of claim 12 wherein the output element is further defined as one of a speaker or a display of the mobile device.

14. The system of claim 13 further comprises an accelerometer, wherein the trace collection module is configured to receive input from the accelerometer and operates to determine the number of steps taken by user of the mobile device along the particular route.

15. The system of claim 14 wherein the navigation module compares the input from the magnetometer to the reference data using a Dynamic Time Warping method.

16. The system of claim 15 further comprises a barometer, wherein the navigation module determines changes in elevation along the particular route using input from the barometer.

17. The system of claim 10 further comprises a route publish module configured to receive reference data for the particular route from a route source external to the mobile device and, in response to receiving the reference data for the particular route, storing the reference data for the particular route in the data store.

* * * * *